(12) United States Patent
Fong et al.

(10) Patent No.: US 11,303,639 B2
(45) Date of Patent: Apr. 12, 2022

(54) SECURE EXECUTION ENCLAVE FOR USER EQUIPMENT (UE)

(71) Applicant: PPIP LLC, Tempe, AZ (US)

(72) Inventors: Michael Fong, Chandler, AZ (US); Nerie Hsin-wu Fong, Tempe, AZ (US); Mohamad Ahmad Foustok, Parkland, FL (US)

(73) Assignee: PPIP, LLC, Chandler, AZ (US)

( * ) Notice: Subject to any disclaimer, the term of this patent is extended or adjusted under 35 U.S.C. 154(b) by 124 days.

(21) Appl. No.: 16/747,322

(22) Filed: Jan. 20, 2020

(65) Prior Publication Data
US 2021/0226955 A1    Jul. 22, 2021

(51) Int. Cl.
*H04L 29/06* (2006.01)
*H04L 9/08* (2006.01)

(52) U.S. Cl.
CPC .......... *H04L 63/101* (2013.01); *H04L 9/0894* (2013.01); *H04L 63/0435* (2013.01); *H04L 63/0884* (2013.01)

(58) Field of Classification Search
CPC . H04L 63/101; H04L 63/0884; H04L 9/0894; H04L 63/0435
See application file for complete search history.

(56) References Cited

U.S. PATENT DOCUMENTS

| | | | | |
|---|---|---|---|---|
| 7,437,362 | B1 * | 10/2008 | Ben-Natan | G06F 21/6227 |
| 2002/0156895 | A1 * | 10/2002 | Brown | G06Q 10/00 |
| | | | | 709/226 |
| 2009/0023475 | A1 * | 1/2009 | Chang | H04M 1/72409 |
| | | | | 455/557 |
| 2013/0310003 | A1 * | 11/2013 | Sadhvani | H04W 12/069 |
| | | | | 455/411 |
| 2014/0181290 | A1 * | 6/2014 | Wong | H04L 63/10 |
| | | | | 709/224 |
| 2015/0081768 | A1 * | 3/2015 | Chen | H04L 67/26 |
| | | | | 709/203 |
| 2016/0173617 | A1 * | 6/2016 | Allinson | H04L 67/02 |
| | | | | 709/227 |
| 2016/0306962 | A1 * | 10/2016 | Lee | H04W 12/02 |
| 2019/0213038 | A1 * | 7/2019 | Meriac | G06F 9/4818 |

FOREIGN PATENT DOCUMENTS

WO    2005093989 A1 * 10/2005 ........... G06F 21/105

* cited by examiner

*Primary Examiner* — Hosuk Song
(74) *Attorney, Agent, or Firm* — Fernando & Partners, LLP

(57) ABSTRACT

In some embodiments, an apparatus (e.g., a first device) for secure execution of software is provided. The apparatus includes a housing arranged to hold a second device. The apparatus includes a memory configured to store a set of instructions of an application, a local communications device, and a processor. The apparatus is configured to execute the application and transmit a first set of data via the local communication device to be processed by the second device. The apparatus may receive, input data from the second device, interpret the input data using the set of instructions of the application, and transmit a second set of data via the local communication device to be processed by the second device, the second set of data may reflect an updated active state of the application.

20 Claims, 7 Drawing Sheets

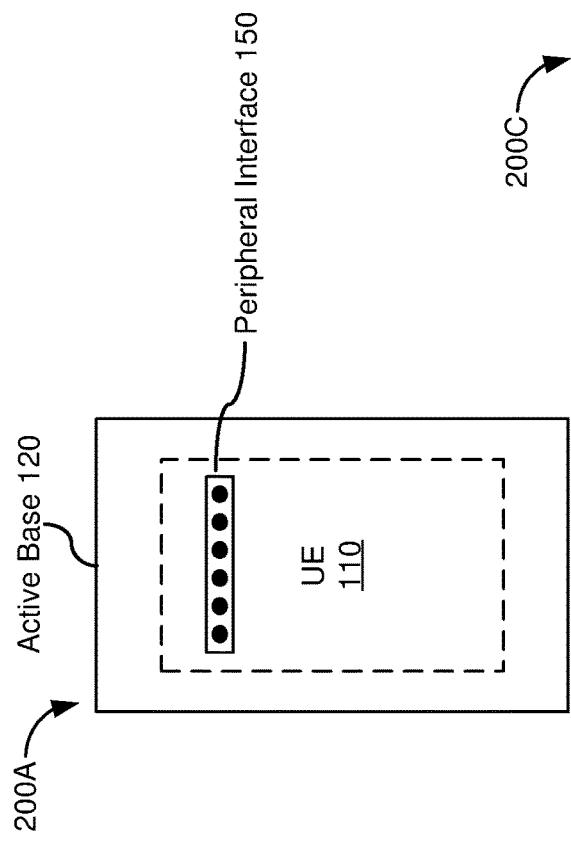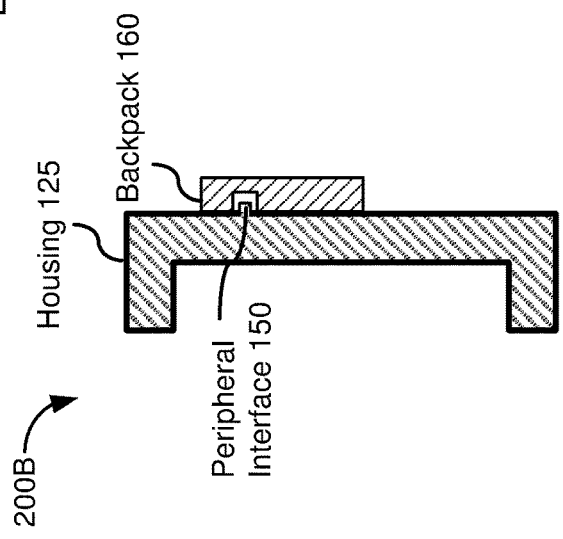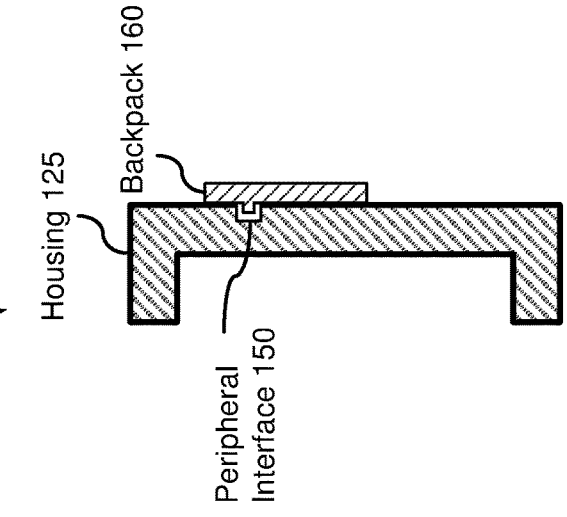

SECURE EXECUTION ENCLAVE FOR USER EQUIPMENT (UE)

TECHNICAL FIELD

This relates generally to the field of device security, and more specifically to an apparatus for preventing third-party software attacks on mobile devices.

BACKGROUND

Smartphones have sensors for collecting information of a user, including the surroundings of the user, e.g., microphones for recording voice, cameras for recording images, and an inertial measurement unit (IMU) for measuring location and position of the user. Smartphones also have radios for local or remote communications, such as a cellular radio for communicating with a base station, Global Positioning System (GPS) radio for communicating with a satellite, or a near field communication (NFC) radio, a WiFi radio, and/or a Bluetooth radio for pairing with another device nearby. The sensors and radios are capable of providing a wealth of user information to third parties, such that real-time and/or historical records of the user can be established. Third party software applications, are further, sometimes able to gain system privileges and access confidential elements such as files, emails, GPS locations, images, messages, etc. Currently, most smartphones do not alert users of the collection and dissemination of user private data. Consequently, when third-parties or third-party applications (e.g., hackers) gain unwanted access to a smartphone (e.g., hijack), a user may not be aware of the privacy invasion.

Third party software applications are sometimes able to gain system privileges and access confidential elements such as files, emails, GPS locations, images, messages etc. In addition to applications, websites or cookies may also include malware that cause or require a user to execute something harmful or transmit sensitive user information from the device without explicit authorization from the user. Malware (e.g., spyware) on compromised mobile devices, may access video capabilities turning themselves on as listening stations, for example. Further damage may be caused by an application that accesses texts, emails and other user information when a user is unsuspecting, and may communicate with an outside server and post confidential/private material without user authorization. There exists a need, therefore, to limit certain applications access to hardware and software elements on a mobile device in order to balance user demands of functionality and security.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

FIGS. 2A-2C are illustrations of exemplary peripheral interfaces connectable to a housing of the apparatus in accordance with some embodiments;

Figure 1:
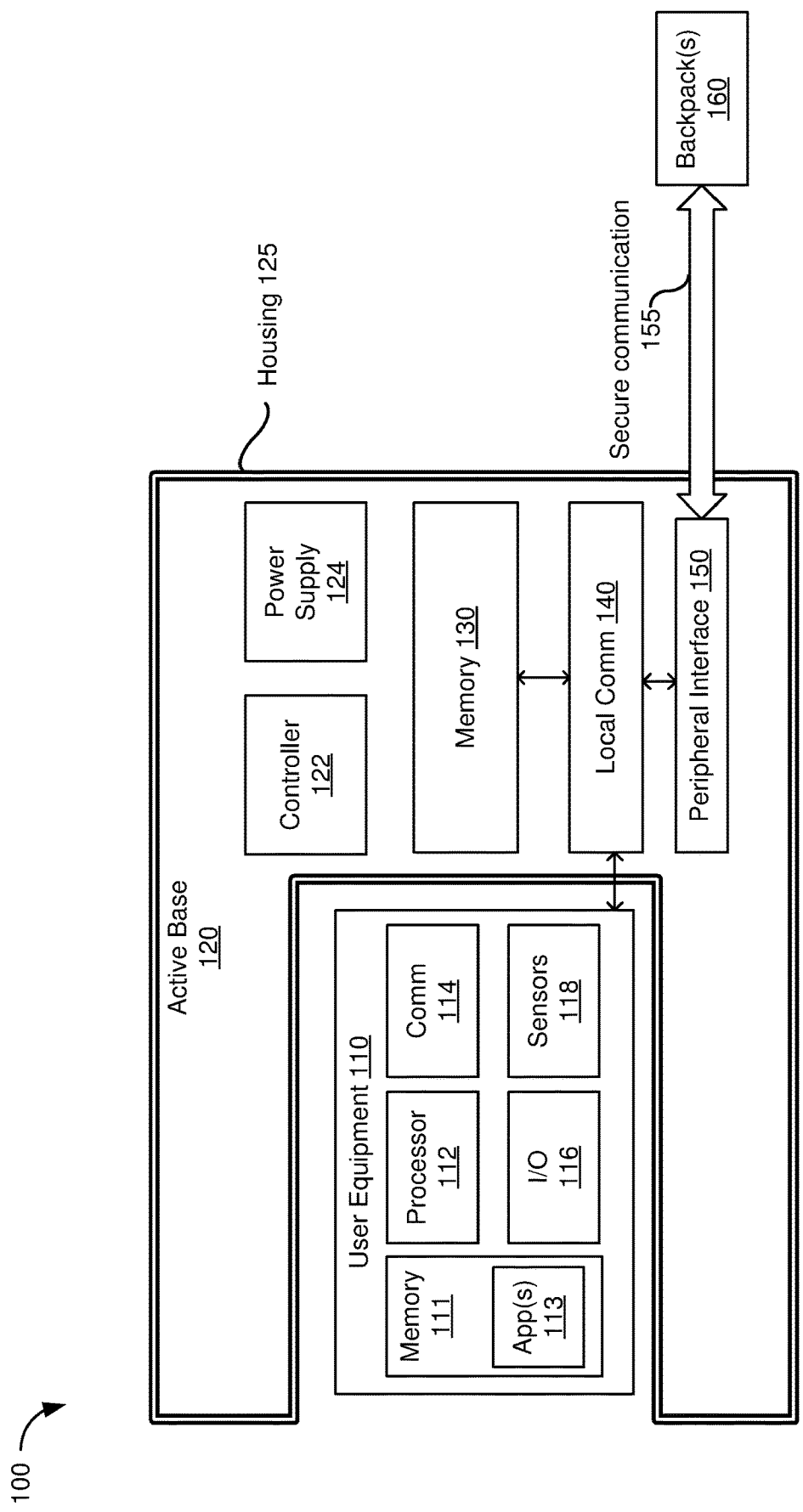
FIG. 1 is a block diagram of an exemplary apparatus holding a personal communication device in accordance with some embodiments.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

The secure enclave in conjunction with the safe case may also prevent software branching attacks or side channel attacks. Side-channel attacks may include attacks based on information gained from the implementation of the computer system, rather than weaknesses in the implemented algorithm itself such as cryptanalysis and software bugs. For example, timing information, power consumption, electromagnetic leaks, audio, or video may provide extra sources of information, that are exploited by the third-party software. In some embodiments, by code signing, using the digital keys, and executing the signed code on the safe case, the processor of the safe case may execute a safer version of the third-party software. Further, the safe case may restrict the third-party software's access to private information. For example, in case the third-party software being executed on the safe case wants to exploit native resources, such as voice, video, location data, etc. on the electronic devices, the safe case may either not provide such data or provide morphed voice, blurred video, modified GPS data, etc., to the third-party software.

In some embodiments, applications may be run on the mobile device, while the safe case monitors execution of the applications. For example, when a user plugs in their mobile device to the safe case, the safe case may automatically begin interacting with the mobile device and monitoring execution of the applications. In some embodiments, a hardware switch may be executed to turn on or off secure execution of applications. In the present embodiment, the safe case may actively filter out data, prevent execution of applications, block applications, or prevent access to certain data by the applications being run on the mobile device.

In yet another embodiment, a user may select one or more affordances on a mobile device. After the selection or initiation of the application, the safe case may receive the request for execution of the application. The application may execute on the safe case whereby monitoring is local and automatic on the safe case. In this example, the safe case may prevent data automatically from being accessed by applications. Similarly, the applications being executed on the safe case may be monitored for inappropriate requests, and prevented or blocked. The safe case may receive one or more requests from the mobile device, interpret the request(s) locally on the safe case, and then monitor that request based on one or more permissions lists, access control lists, digital keys, etc.

In some embodiments, a first device (e.g., a safe case) may include a housing to hold a second device. The first device may include, for example, one or more processors, memory, and a local communication device connectable to an interface to the second device. The first device may execute an application using its processor(s) where a set of instructions associated with the application are stored on the first device's memory. The first device may, in some embodiments, transmit a first set of data using the local communication device in order to be processed by the second device. In some embodiments, the first set of data may trigger the second device to display input data associated with the application running on the first device. The first device may further receive input data using the local communication device, from the second device. The first device may then interpret the input data by using the set of instructions of the application stored in the housing's memory. Finally, the first device may transmit a second set of data using the local communication device, in order to be processed on the second device. The second user interface data may reflect one or more updated active states of the application as it is different from the first set of data accounting for the interpretation of the input data.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments are practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

It should be appreciated that in the development of any actual embodiment (as in any development project), numerous decisions must be made to achieve the developers' specific goals (e.g., compliance with system and business related constraints), and that these goals will vary from one embodiment to another. It will also be appreciated that such development efforts might be complex and time consuming, but would nevertheless be a routine undertaking for those of ordinary skill in the art of image capture having the benefit of this disclosure.

Referring to FIG. 1, a simplified block diagram 100 of an apparatus 120 (or an active base 120) holding a personal communication device 110 (or a UE, User Equipment) is depicted, in accordance with some embodiments. Different from a conventional base or case that merely holds a personal communication device, the active base 120 actively monitors and analyzes the personal communication device 110 in order to determine whether the personal communication device 110 is a compromised device. In some embodiments, the active base 120 includes one or more non-transitory memories such as memory 130 as well as a local communication device 140 and a peripheral interface 150.

In some embodiments, the active base 120 includes a housing 125 arranged to hold the personal communication device 110 (e.g., smartphone, wearable, tablet, etc.). In some embodiments, the housing 125 includes a plurality of components mateable with one another. In other words, the plurality of components, once mated with one another, form an assembly to hold and/or provide structural support of the personal communication device 110. The housing assembly allows a user to insert the personal communication device 110 into the active base 120 for more protection of work-related sensitive information (e.g., in a work mode) or take the personal communication device 110 out of the active base 120 for less monitoring of the personal communication by enterprise (e.g., in a personal mode).

Figure 3:
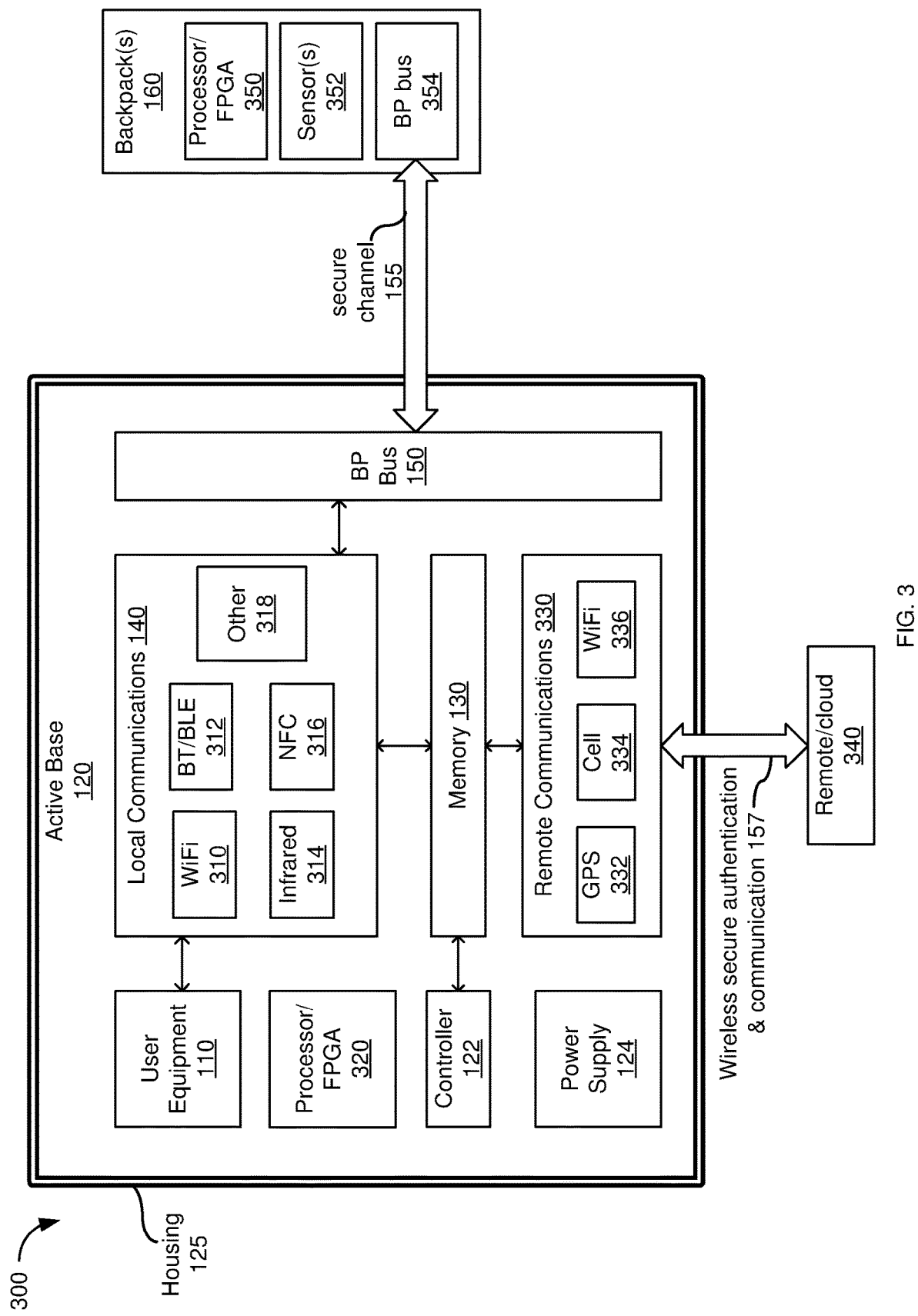
FIG. 3 is an illustration of an exemplary system comprising the apparatus enclosing the personal communication device in communication with backpack(s) and/or cloud in accordance with some embodiments.

The housing 125 can have one or more moveable components (e.g., a hood) operable to slide to one or more positions (e.g., up or down) as well as non-moveable components. In such embodiments, the one or more moveable components, when in a first position (e.g., hood pushed down), are mateable (e.g., mechanically and/or electrically) with the non-moving components to form a housing assembly. The housing assembly forms an enclosure that at least partially supports and holds the personal communication device 110, e.g., a partial enclosure as shown in FIG. 1 or a whole enclosure encapsulating the personal communication device 110 as shown in FIG. 3.

When in the first position, the housing 125, along with other components of the active base 120, protects the personal communication device 110 against tracking or spying, e.g., by audio jamming, camera covering, and/or RF shielding, etc. When the one or more moveable components of the housing assembly are in a second position (e.g., a hood slid up), a user can take the personal communication device 110 out of the housing 125 and place the personal communication device 110 in a non-protected mode.

In some embodiments, the active base 120 includes a peripheral interface 150 (e.g., a backpack interface) to connect to a supplemental functional device 160 (e.g., a backpack). A supplemental functional device, as described herein, is a device connectable to the personal communication device 110 through the active base 120 and provides supplemental functions to the personal communication device 110.

The peripheral interface 150 connects the supplemental functional device 160 to the active base 120 and a local communication device 140 further connects the peripheral interface 150 to the personal communication device 110. As such, the peripheral interface 150 is a modular interface for the backpack 160, which is a detachable device that allows supplemental hardware and software functionalities to be provided to the user of the active base 120. The supplemental functional device 160 is further described below with reference to FIG. 3.

In some embodiments, the housing 125 at least partially supports the peripheral interface 150. For example, in FIG. 2A, an exemplary cross-sectional view 200A shows that the peripheral interface 150 includes a number of connectors (e.g., contact pins or contact pads as indicated by the dots) connectable to the supplemental functional device 160. In some embodiments, the connectors are affixed to the housing 125 and at least partially supported by the housing 125, as shown in an exemplary cross-sectional view 200B in FIG. 2B. The connectors are mateable to the interface of the supplemental functional device 160. In some embodiments, as shown in an exemplary cross-sectional view 200C in FIG. 2C, the peripheral interface 150 is wholly supported by the housing 125, such that the peripheral interface 150 is integrated with or embedded in the housing 125 surface. In such embodiments, connectors from the supplemental functional device 160 can be plugged into the peripheral interface 150 in order to connect the supplemental functional device 160 to the active base 120.

In the embodiments shown in FIGS. 2B and 2C, the peripheral interface 150 is operable to communicate with the supplemental functional device 160 via a physical wired channel including communication connectors. The physical channel forms a secure channel 155 for communication between the active base 120 and the supplemental functional device 160 as shown in FIG. 1.

It should be noted that though FIGS. 2A-2C illustrate the peripheral interface 150 with physical connectors that can provide a wired connection, in some embodiments, the peripheral interface 150 is a wireless interface. In some embodiments, the peripheral interface 150 includes a wireless modem operable to wirelessly communicate with the supplemental functional device 160. In some embodiments, the peripheral interface 150 leverages the wireless communication capability of the local communication device 140 to communicate with the supplemental functional device 160. For example, the active base 120 can connect to a wireless communication enabled backpack device 160 through a wireless peripheral interface 150 or through a wireless modem of the local communication device 140. As such, a wireless communication enabled supplemental functional device 160 can communicate with the active base 120 without being in contact with the housing 125 or physically connected to the peripheral interface 150.

In some embodiments, the active base 120 includes a local communication device 140 coupled to the peripheral interface 150 and supported by the housing 125. In some embodiments, the local communication device 140 includes one or more personal communication device interface modems (e.g., a WiFi modem 310, a BT/BLE radio 312, an infrared radio 314, an NFC radio 316, or other connection 318 such as a Lightning® (a registered trademark of Apple Inc., Cupertino, Calif.) connector, etc.) operable to provide a communication channel (e.g., wirelessly or via physical connection) between the peripheral interface 150 and the personal communication device 110.

In one direction, the communication channel carries information from the personal communication device 110 to the active base 120 for validation. In the other direction, the communication channel carries information from the supplemental functional device 160 via the peripheral interface 150 to the personal communication device 110 in order to supplement the functionality of the personal communication device 110.

In some embodiments, the active base 120 includes a controller 122 coupled to the peripheral interface 150 and the local communication device 140. Embodiments of the controller 122 include hardware, software, firmware, or a combination thereof. In some embodiments, the controller 122 is operable to manage the communication channel between the personal communication device 110 and the supplemental functional device 160 and through the local communication device 140 and the peripheral interface 150. In other words, the controller 122 manages a segment of the communication channel between the personal communication device 110 and the active base 120 through the management of the local communication device 140, and the controller 122 manages a segment of the communication channel between the active base 120 and the supplemental functional device 160 through the management of the peripheral interface 150. The communication between the supplemental functional device 160 and the personal communication device 110 under the management of the controller 122 is further described with reference to FIG. 3 below.

In addition to managing the communication channel, the controller 122 manages execution and download of the third-party software. For example, the controller 122 may manage the digital keys for the software including the downloading, verification, and storage using an encryption such as a Public Key Infrastructure (PKI). The controller 122 may also create, manage, and/or traverse one or more access control lists and/or permissions lists for various software. For example, the controller 122 may determine a permissions list for an application and which hardware or software resources it can access. The controller 122 may have automatic restrictions based on the digital key. In other embodiments, the controller 122 may set permissions automatically for all applications. In another embodiment, the controller 122 may have one or more databases such as an access control list which indicates which applications or software are allowed to be executed on the user equipment 110. For example, the access control list may indicate that calling related applications is not allowed to be executed on the user equipment 110. In another embodiment, the controller 122 may set the access control list so that applications downloaded as third-party are restricted to execution on the active base 120.

In some embodiments, the active base 120 includes a power supply 124. The power supply 124 supplies power to the peripheral interface 150, the local communication device 140, and/or the controller 122. In some embodiments, the power supply 124 includes at least one of a battery, a charging socket, a USB connector, a power plug, and/or a power socket. In some embodiments, the power supply 124 includes a connector for a battery. Though not shown in FIG. 1, in some embodiments, the power supply 124 includes a plurality of power supplying components, e.g., one battery providing power to the peripheral interface 150, a power plug providing power to the local communication device 140 and/or the controller 122, etc. The plurality of power supply components can be connected to be charged together, charged separately, aggregating power to supply to one or more hardware electronic components of the active base 120, or separately providing power to one or more hardware electronic components of the active base 120.

In some embodiments, the personal communication device 110 held by the active base 120 includes a processor 112, one or more communication devices 114, an input/output interface 116, sensors 118, memory 111, and applications 113, which further includes instructions stored in the memory 111 and executed by the processor 112. In some embodiments, the personal communication device 110 is a portable communications device, such as a mobile phone, a wearable device, a tablet, a laptop computer, a digital media player, an electronic reader, or the like. In some embodiments, the personal communication device is a non-portable device, such as a desktop computer, a data storage device, a smart TV, a video game console, a smart home appliance or the like that is capable of storing, transmitting, and receiving data.

It will be appreciated that the components, devices or elements illustrated in and described with respect to FIG. 1 below may not be mandatory and thus some are omitted in certain embodiments. Additionally, some embodiments can include further or different components, devices or elements beyond those illustrated in and described with respect to FIG. 1.

In some embodiments, the processor 112 is coupled to the one or more communication devices 114 in order to control the communication using the one or more communication devices 114, in accordance with some embodiments. In addition to controlling communication, the processor 112 processes data and executes applications 113, in accordance with some embodiments. In some embodiments, the processor 112 includes one or more chips and/or chipsets embodied in a variety of forms. For example, the processor 112 can be embodied as various hardware-based processing means such as a microprocessor, a coprocessor, a controller, or other computing devices including integrated circuits, such as an ASIC (application specific integrated circuit), an FPGA (field programmable gate array), some combination thereof, or the like.

Although illustrated as a single processor, it will be appreciated that the processor 112 can comprise a plurality of processors. The plurality of processors may communicate with each other and collectively perform one or more functionalities. In some embodiments, the processor 112 can be configured to execute instructions that can be stored in the memory 111 or that can be otherwise accessible to the processor 112. As such, whether configured by hardware or by a combination of hardware, firmware, and software, the processor 112 is capable of performing operations according to various embodiments.

In some embodiments, the memory 111 includes one or more memory devices, including fixed and/or removable memory devices. In some embodiments, the memory 111 provides a non-transitory computer-readable storage medium for storing computer program instructions (e.g., the application(s) 113) to be executed by the processor 112. In some embodiments, the memory 111 exchanges information with one or more of the processor 112, the input/output interface 116, the one or more communication devices 114, or sensors 118, via a bus.

In some embodiments, the applications 113 stored in the memory 111 include an application for exchanging information between the personal communication device 110 and an external electronic device (e.g., the active base 120). The information exchange includes, for example, transmitting information obtained by the one or more communication devices 114 and/or sensors 118 to an external electronic device (e.g., the active base 120) or receiving information from the external electronic device, e.g., the information gathered by the supplemental functional device 160 and relayed by the active base 120 via the peripheral interface 150 and the local communication device 140.

In some embodiments, the input/output interface 116 provides a channel for input/output data between the processor 112 and input/output peripheral devices, such as a display, a keyboard, a mouse, a pen, microphones, cameras, and/or speakers of the personal communication device 110. In some embodiments, the peripheral devices are connected to the input/output interface 116 wirelessly, e.g., via the one or more communication devices 114.

In some embodiments, the one or more communication devices 114 connect the personal communication device 110 and an external electronic device wirelessly or through a wired connection. In some embodiments, the external electronic device is the active base 120, such that the one or more communication devices 114 connect to the active base 120 wirelessly or through a wired communication. The wireless communication includes at least one of, for example, Wi-Fi (e.g., IEEE 802.11a, IEEE 802.11b, IEEE 802.11g, IEEE 802.11n, and/or IEEE 802.11ac), Bluetooth (BT), Bluetooth Low Energy (BLE), Near Field Communication (NFC), Global Positioning System (GPS), and/or cellular communication, including but not limited to long term evolution (LTE), wideband code division multiple access (W-CDMA), code division multiple access (CDMA), time division multiple access (TDMA), or Global System for Mobile Communications (GSM). The wired connections include at least one of, for example, a Universal Serial Bus (USB) connector, a High Definition Multimedia Interface (HDMI) connector, and/or a Lightning® (a registered trademark of Apple Inc. of Cupertino, Calif.) connector.

In some embodiments, the personal communication device 110 includes sensors 118, such as one or more accelerometers, gyroscopes, and/or magnetometers (e.g., as part of an inertial measurement unit (IMU)) for obtaining information concerning the position (e.g., altitude) of the personal communication device 110, light sensors, or acoustic sensors. In some embodiments, the sensors 118 are coupled to the input/output interface 116, such that the information collected by the sensors 118 are passed to the processor 112 by the input/output interface 116 for further processing. For example, the input device camera uses light sensors for light sensing.

In some embodiments, the sensors 118 are coupled to the one or more communication devices 114, such that the information collected by the sensors 118 is transmitted to another device (e.g., the active base 120) for validation. In some embodiments, the sensors 118 are coupled to the power supply (e.g., a battery) of the personal communication devices 110 for obtaining the power level of the personal communication devices 110.

Turning to FIG. 3 is a block diagram of an exemplary system 300, which comprises the active base 120 enclosing the personal communication device 110 in communication with the supplemental functional device 160 and/or a remote secure validator in a cloud 340 through secure channels 155 and 157 in accordance with some embodiments. In some embodiments, the active base 120 may include a processing element 320, such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

In some embodiments, the supplemental functional device 160 also includes a processing element 350, such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. In some embodiments, the supplemental functional device 160 includes sensors 352 to collect information.

The information collected by the sensor(s) 352 are processed by the processing element 350 and communicated to the peripheral interface (e.g., a backpack bus) 150 via the secure channel 155, e.g., through wired connection between the peripheral interface 150 and an interface 354 (e.g., a backpack bus) on the supplemental functional device 160. Upon receiving the information, the peripheral interface 150 sends the information to the local communication device 140 under the management of the controller 122, and the controller 122 further directs the information to the personal communication device 110. The additional information gathered by the supplemental functional device 160 supplements the functionality of the personal communication device 110. Moreover, in some embodiments, the active base 120 analyzes the additional information gathered by the supplemental functional device 160 and uses the information to further determine if the personal communication device 110 has been compromised.

In some embodiments, information associated with the personal communication device 110 is transmitted to a remote secure validator 340 (e.g., a remote secure validator on a remote server or a private cloud) for further validation remotely. In such embodiments, the active base 120 includes a remote communication device 330 supported by the housing to transmit the information associated with the user equipment to the remote secure validator 340. In some embodiments, the remote secure validator 340 is a trusted source, such that the communication channel between the remote communication device 330 and the remote secure validator 340 is authenticated and secure. The remote communication device 330, in some embodiments, includes one or more wireless communication devices, such as a GPS module 332, a cellular communication module 334, and a WiFi radio 336.

The remote communication device 330 uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), wideband code division multiple access (W-CDMA), code division multiple access (CDMA), time division multiple access (TDMA), and/or Wi-Fi (e.g., IEEE 802.11a, IEEE 802.11b, IEEE 802.11g, IEEE 802.11n, and/or IEEE 802.11ac), or any other suitable communication protocol, including communication protocols not yet developed as of the filing date of this document.

Figure 4:
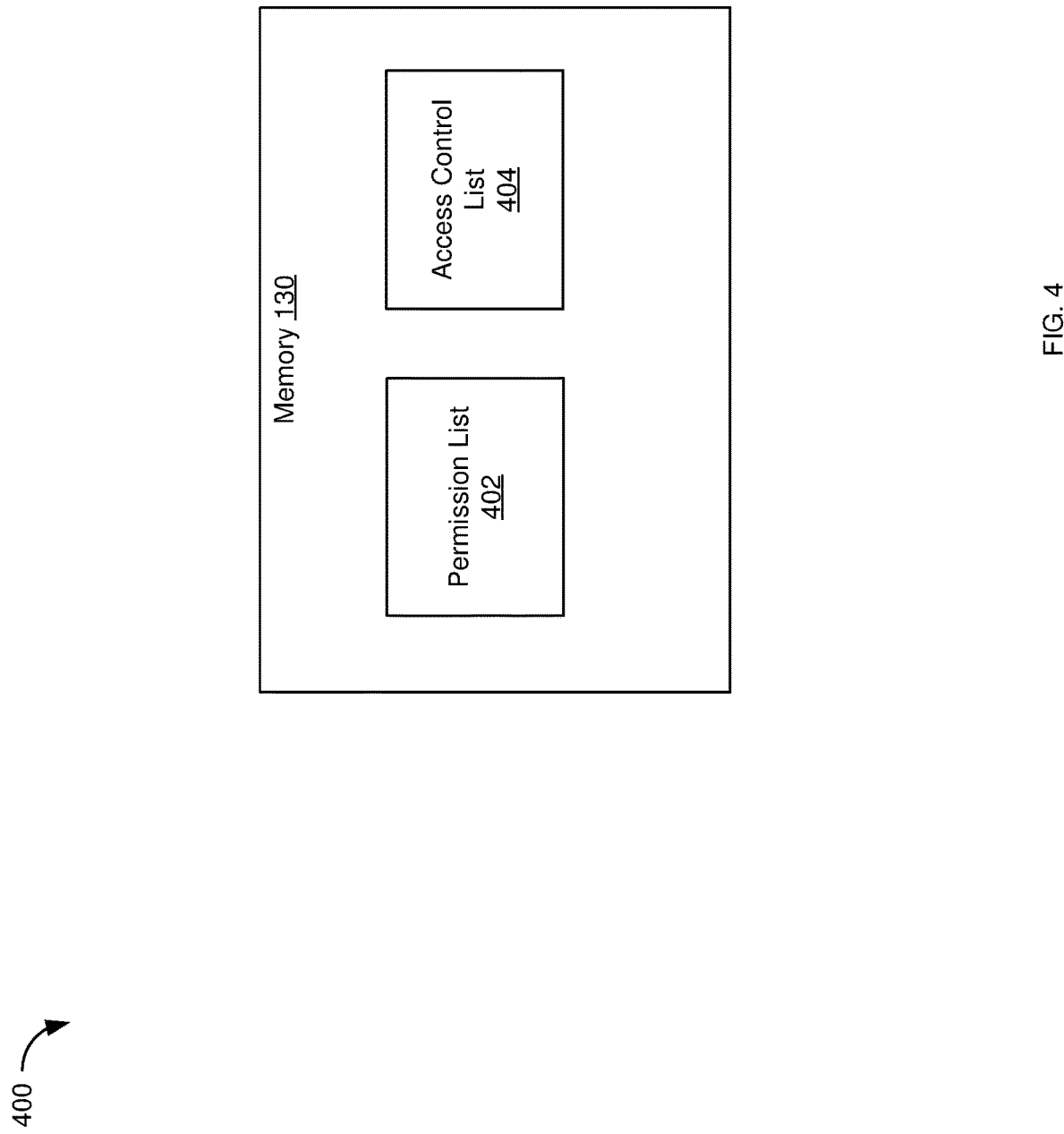
FIG. 4 is an illustration of an exemplary memory device in accordance with some embodiments.

FIG. 4 is a block diagram 400 of an exemplary memory device 130 in accordance with some embodiments. The memory device 130 may include a permissions list 402 and/or an access control list 404. The memory device 130 may interact with the local communications device 140, the controller 122, as well as the remote communications device 330. For example, the local communications device 140 may receive a request from the user equipment 110 to execute an application and/or to check if there is permission to execute the application, e.g., verifying the storing of a digital key in the non-transitory memory of the memory device 130. The controller 122 may determine using the access control list 404 that an application may or may not be executed on the user equipment 110. For example, the controller 122 may determine that the application is not trusted and therefore would not be executed.

In another embodiment, the controller 122 may determine that a third-party application is allowed to be executed on the active base 120 according to the access control list 404. Further, the third-party application may communicate with a remote device using the remote communications device 330. Similar to the access control list 404, the permissions list 402 may indicate which resources are allowed to be used on the active base 120 for third-party applications. For example, having determined that an application is allowed to be executed on the active base 120 according to the access control list 404, the active base 120 may query and/or traverse the permissions list 402 to see which physical resources the application is allowed to use on the active base 120.

Figure 5:
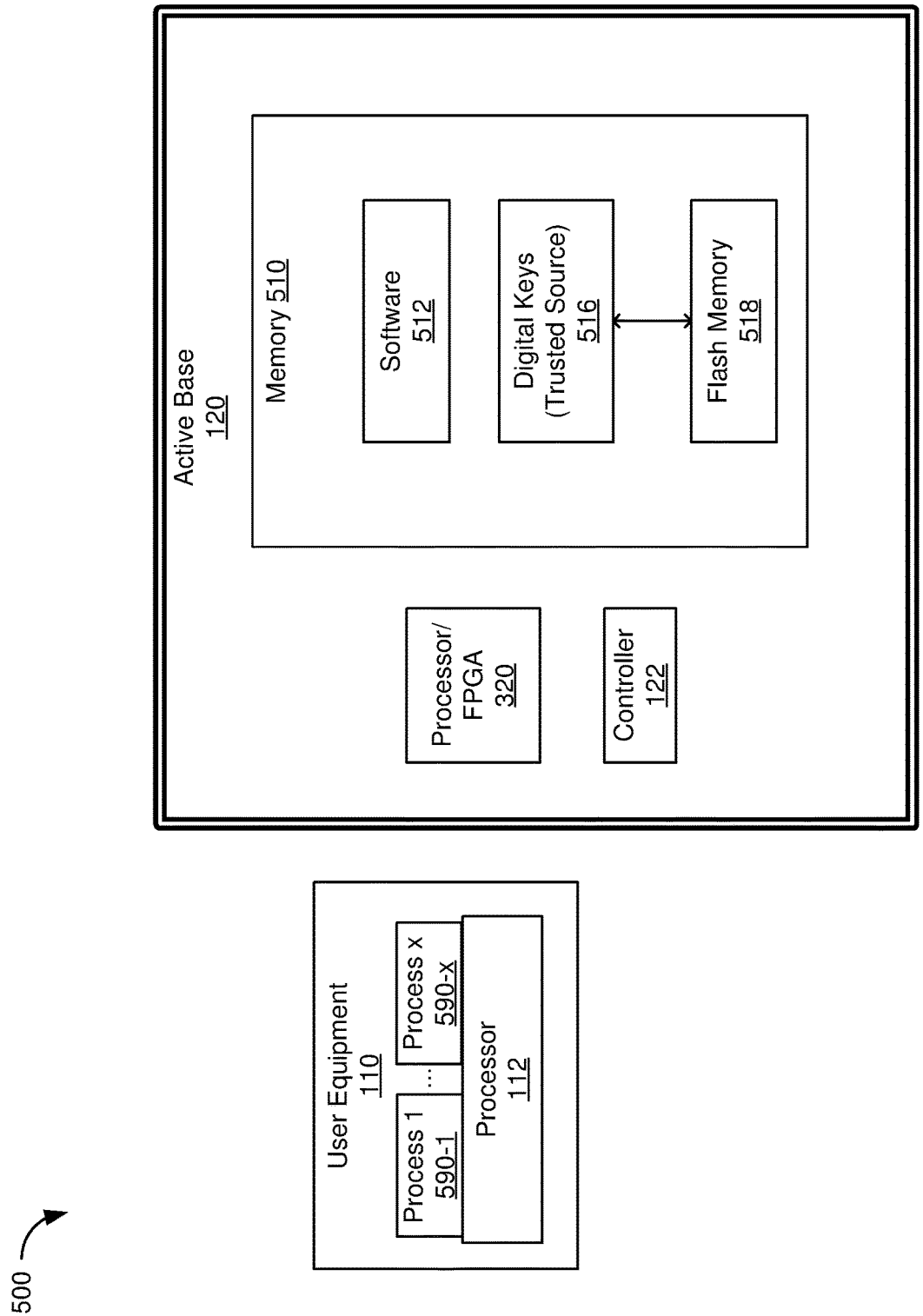
FIG. 5 is an illustration of an exemplary secure enclave trusted software system in accordance with some embodiments.

FIG. 5 is an illustration of an exemplary secure enclave 500 trusted software system in accordance with some embodiments. The secure enclave 500 may include the user equipment 110 attached or connected to active base 120. As pictured, processor 112 may execute one or more processes 590-1 . . . 590-$x$ (collectively referred to as one or more processes 590) at a time, e.g., executing process 1 590-1 at time $T_1$ and/or executing process x 590-$x$ at time $T_x$, etc. Active base 120 may include memory 510, controller 122 and processor/FPGA 320. In some embodiments, memory 510 may include software 512, digital keys 516 and flash memory 518. Software 512 may include one or more sets of instructions for third-party applications to be executed on the active base 120 rather than the user equipment 110. In some embodiments, software 512 are whole applications stored locally on active base 120 rather than on the user equipment 110.

In some embodiments, active base 120 may provide a secure container or enclave which is an isolated execution environment for various applications. The active base 120 may have storage for one or more sets of digital keys. In some embodiments, the digital keys 516 are downloaded and accessed on the active base 120 before executing the appropriate application. For example, a user may download an application, the active base 120 may store that application in software 512 and automatically download the software's keys to digital keys 516. Flash memory 518 may include one or more types of secure memory modules that cannot be tampered with such as Read Only Memory (ROM).

In some embodiments, the high-security system architecture as shown in FIG. 5 provides a hardware root of trust for the broader system. Due to designs of mobile devices, each layer of a mobile device stack, e.g., from a hardware layer at the bottom to a firmware layer above the hardware layer, then an operating system layer and an application layer on top of the firmware layer, is vulnerable. In some embodiments, the active base 120 provides a hardware root of trust that starts from the hardware layer, e.g., using a specialized system and crypto architecture to create a root key using a hardware true random number generator and stores the root key in the secure storage of the active case, e.g., the memory 130 in FIGS. 1 and 2 and/or the memory 510 in FIG. 5. As such, the root key is not exposed and cannot be externally extracted. In some embodiments, the active base 120 and/or the backpack 160 (FIG. 3) can then generate a certificate signing request within the device and use the root key to generate one or more X.509 certificates for one or more processes (e.g., using hashing or other certificate generating techniques). Accordingly, an appropriate X.509 certificate bundle can be produced, provisioned, and/or stored within the device (e.g., as the digital keys 516 on the active base 120) to maintain stringent control of allowed processes for execution.

Using such trusted and secure resources, the active base 120 can identify processes that are safe to execute (e.g., by comparing signatures with X.509 certificates stored in the memory 510) as well as malicious activities. In case the safe programs are identified, in some embodiments, the active base 120 allows the safe programs to be executed. As such, the active base 120 facilitates the creation of the secure enclave 500. In case the unsafe programs are identified, in some embodiments, the active base 120 quarantines or reports the unsafe programs in order to protect the user equipment 110.

The applications executed inside the secure enclave 500 are protected against potentially malicious third-party software. A user may install and run various third-party software, e.g., the processor 112 on the user equipment 110 executes multiple processes associated with the third-party software, e.g., process 1 590-1 . . . process x 590-x. For security, the active base 120 can have a secure storage (e.g., at least a portion of the memory 510) for storing the digital keys 516. The digital keys 516 are associated with the third-party software and/or processes. Using the digital keys 516 and through code signing, the third-party software and/or processes can be executed safely on the active base 120.

By code signing using the digital keys 516, and executing the signed code (software 512) on the active base 120, the processor 320 of the active base 120 can execute a safe version of third-party software. Additionally, the active base 120 may restrict the third-party software's access to private information in conjunction with or in addition to using the permissions list 402 or access control list 404. In one example, when software 512 being executed on the active base 120 wants to exploit voice, video, location data on the user equipment 110 and/or the active base 120, the active base 120 may either not provide such data (e.g., denying the permission) or provide morphed voice, blurred video, modified GPS data, etc., to the software 512.

Figure 6:
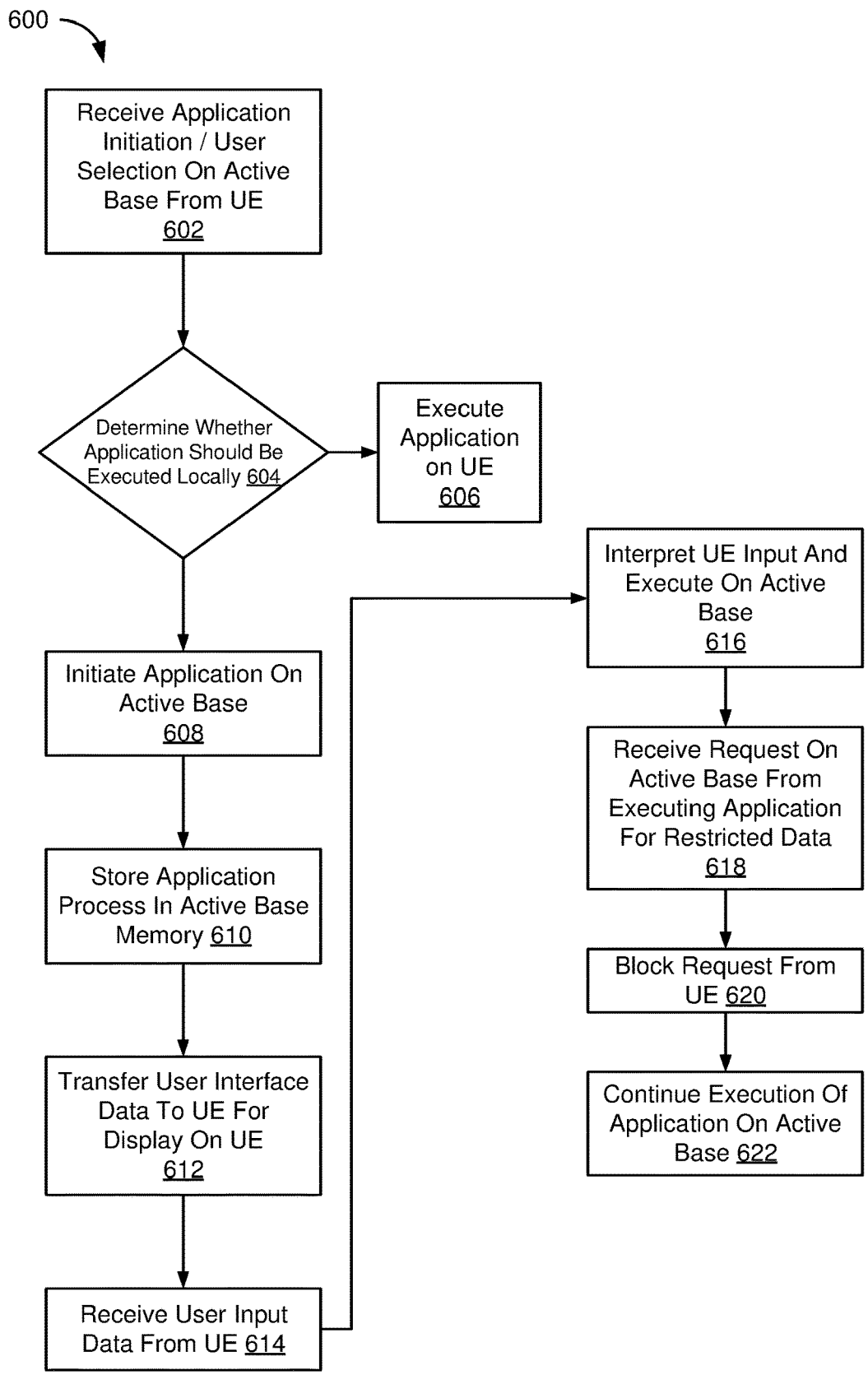
FIG. 6 is a flowchart illustrating a method of executing a third-party software in a secure execution enclave in accordance with some embodiments.

FIG. 6 is a flowchart illustrating a method 600 of executing third-party software in a secure execution enclave in accordance with some embodiments. In step 602, the active base 120 may receive one or more sets of data from user equipment 110. For example, the active base 120 may receive a download request for an application. In another embodiment, an application is downloaded onto the user equipment 110 and the active base 120 may receive a request for application initiation/execution. In yet another embodiment, an application on the user equipment 110 may trigger a request for application initiation/execution, e.g., an inquiry of whether a digital key exists on the active base 120 and/or an action of lifting a portion of the active base 120 triggering monitoring of the camera application, etc. The active base 120 may receive the requests through local communications device 140. In some embodiments, the active base 120 may receive a request when a user selects the application via one or more affordances on the user equipment 110. The request can also be for monitoring the application and/or for checking whether there is permission to execute the application.

The active base 120 may then proceed to step 604. In step 604, the active base 120 may determine whether the application is allowed to be executed locally. In some embodiments, the application is signed and is associated with a set of digital keys 516 in flash memory 518. When the active base 120 identifies the application as a signed application, it may determine that the application is allowed to be executed locally on the active base 120. In another embodiment, the active base 120 may identify the application as not requiring intervention by the active base 120, and proceed to step 606 where the application is executed on the user equipment 110. When the active base 120 determines that the application is allowed to be executed locally, the active base 120 may proceed to step 608.

In some embodiments, the active base 120 retrieves one or more digital keys from a secure storage that is used for the digital keys 516. The active base 120 may authenticate the application using the digital key(s). The active base 120 may execute the application on the active base 120 or on the user equipment 110 when there is a successful authentication of the application using the digital keys 516. In step 606, the application may run on the user equipment 110, while the active base 120 continues monitoring of the application.

In step 608, the active base 120 may initiate executing the application on the active base 120. In executing the application, the active base 120 may verify the signature of software 512 using one or more digital keys 516, via controller 122. The application data is stored as one or more sets of instructions on memory 530 or memory 130. The application and/or its set(s) of instructions are executed by processor 320 in some embodiments. The active base 120 may monitor the application locally and/or automatically. For example, the active base 120 may prevent data from being accessed by applications.

In step 610, the active base 120 may store all or part of the application's instructions in memory 130. For example, the application may store all or part of the applications executing steps in a RAM in memory 130. The processor 320 may, as instructed by controller 122, read and write instructions to memory 130 as executed. In this way, execution and storage of the third-party application by the user equipment 110 is bypassed in a more secure and robust methodology.

While executing the application, active base 120 may decode user interface instructions in some embodiments. In step 612, the active base 120 may transfer one or more sets of data to user equipment 110, e.g., for display on user equipment 110 through local communications device 140 and/or transferring machine-to-machine data to the user equipment 110 for processing. The user equipment 110 may then process and/or display the data. For example, the user may input, select, or change the data displayed on the screen of the user equipment. In step 614, the active base 120 may receive input data from user equipment 110, e.g., user input data and/or data from the user equipment 110 as input to the active base 120. The user interface data may include screen selections, clicks, touches of the screen, and/or hardware buttons.

In step 616, the active base 120 may interpret user equipment input and execute the application according to the input data, on the active base 120. The active base 120 may decode the user equipment input locally. The active base 120 may determine that according to the permissions list 402 some requests may need to be intercepted.

The active base 120 may also receive one or more sets of data to be transmitted to one or more remote destinations. For example, the active base 120 may detect an initiation for transmitting a set of data to a first remote destination when interpreting the user equipment 110 input. The active base 120 may identify whether the first remote destination is on a safe list. Then the active base 120 may transmit the set of data using a remote communication device to a remote destination. In this way the active base 120 may prevent transmission of data to an unsafe base station using the remote communication device local to the active base 120 to redirect the data to a secure base station. The remote communication device may also be used with the digital keys, secure signing, access control list, or privilege checks.

In step 618, the active base 120 may receive a request from the executing application for restricted data. The active base 120 may determine that the request is for restricted data. For example, a flashlight application may request user contacts, or messaging, or other personal data. The active base 120 may determine by accessing the permissions list 402 that the application does not have access to this type of data. Additional examples of inappropriate data requests include GPS locations, images, emails, files, call history, internet browsing history data, etc.

In step 620, the active base 120 may block the request from the user equipment 110. When determining that the requesting application is inappropriately requesting information, the active base 120 may reject this request. In another embodiment, the active base 120 may determine that the application has only certain permissions based on its digital signature. For example, the digital certificate may indicate that the application does not have data access privilege. In another embodiment, the digital certificate may indicate that the application does not have messaging, or email data information.

In step 622, the active base 120 may continue execution of the application on the active case 120. For example, when the flash light application requests user contact information, the request is blocked, while continuing use of the flashlight application. In this way the user equipment 110 is protected, while allowing applications continued uninterrupted use. One skilled in the art would appreciate that various orders and combinations of these steps are taken.

Figure 7:
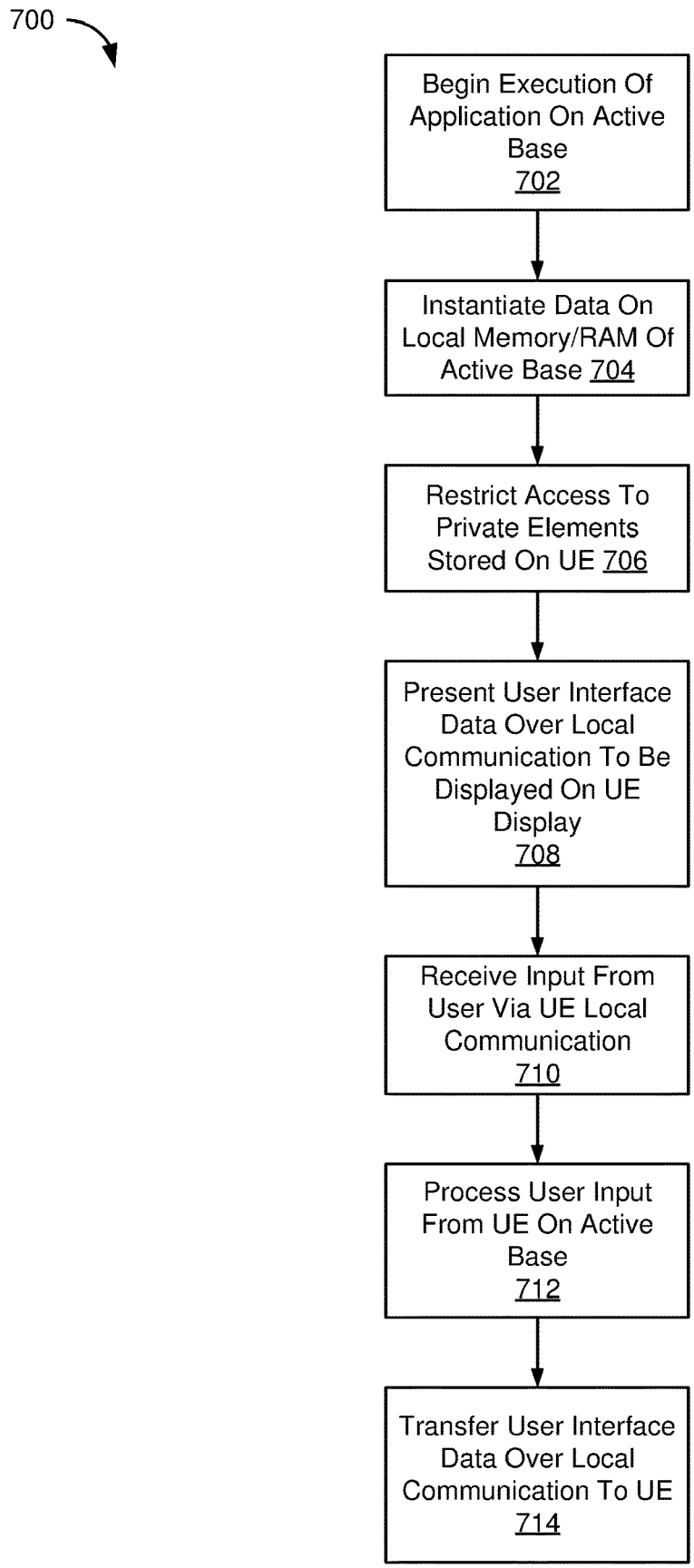
FIG. 7 is a flowchart illustrating a method of restricting third-party software access in a secure enclave in accordance with some embodiments.

FIG. 7 is a flowchart illustrating a method 700 of restricting third-party software access in a secure enclave in accordance with some embodiments. In step 702, the active base 120 may initiate execution of one or more third-party applications locally on the active base 120. In step 704, the active base 120 in conjunction with the controller 122 may instantiate one or more sets of data into memory 130 which is local to the active base 120. In step 706, the active base 120 may query the access list 402 and as a result restrict access to one or more private elements or data stored on the user equipment 110. In step 708, the active base 120 may present the user interface data over the local communication device 140 in order for the user interface data to be displayed on the user equipment 110.

In step 710, the active base 120 may receive input from the user equipment 110. The input is received via the local communication device 140 and managed by the controller 122. In step 712, the active base 120 may process one or more user inputs received from the user equipment 110 using the processor 320. In step 714, the active base 120 may transfer user interface data back to the user equipment 110 once again over the local communication device 140.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at an apparatus including a housing arranged to hold a personal communication device, one or more processors, non-transitory memory, and a local communication device connectable to the personal communication device:
receiving from the personal communication device, via the local communication device, a request for initiating an application on the personal communication device;
determining whether or not to allow executing the application on the personal communication device in response to receiving the request;
receiving, through the local communication device, input data for the application from the personal communication device in accordance with a determination of not allowing executing the application on the personal communication device;
interpreting, using the one or more processors, the input data using a set of instructions associated with the application stored in the non-transitory memory to determine whether or not executing the application using the input data is restricted;
executing, using the one or more processors, the application using the input data in accordance with a determination of not restricting executing the application using the input data; and
transmitting output data via the local communication device to be presented by the personal communication device, wherein the output data reflects an updated state of the application as executed on the apparatus that is different from the input data.

2. The method of claim 1, wherein the non-transitory memory includes a secure storage for storing a set of digital keys, and executing the application includes:
retrieving a digital key from the set of digital keys; and
authenticating the application using the digital key.

3. The method of claim 2, further comprising executing the application on the apparatus upon a successful authentication of the application using the digital key, including comparing a signature of the application with the digital key.

4. The method of claim 2, further comprising:
obtaining a root key stored in the non-transitory memory; and
provisioning the set of digital keys based on the root key.

5. The method of claim 1, wherein:
permitting execution of the application on the personal communication device in accordance with the determination of allowing executing the application on the personal communication device.

6. The method of claim 1, wherein:
the request is originated from the application on the personal communication to access the input data stored on the personal communication device; and
executing the application further includes restricting access to the input data by the application on the personal communication device and providing the output data to the application on the personal communication device in response to the request.

7. The method of claim 1, wherein:
determining whether or not to allow executing the application on the personal communication device includes traversing an access control list stored in the non-transitory memory to determine a privilege of the application for access to the personal communication device; and the determination of not allowing executing the application on the personal communication device includes executing determining that the application lacks the privilege for access to the personal communication device.

8. The method of claim 7, wherein executing the application on the apparatus includes:

executing the application on the personal communication device when it is determined that the application has the privilege for access to the personal communication device.

9. The method of claim 1, further comprising:
determining that access to the input data is restricted; and
blocking the application from accessing the input data.

10. The method of claim 1, wherein:
the request for initiating the application on the personal communication includes an initiation of transmitting the input data to a first remote destination;
determining whether or not to allow executing the application on the personal communication device includes determining whether or not the first remote destination is on a safe list; and
executing the application using the input data includes transmitting, using a remote communication device of the apparatus, the output data to a second remote destination, different from the first remote destination.

11. An apparatus comprising:
a housing arranged to hold a second personal communication device;
a non-transitory memory configured to store a set of instructions associated with an application;
a local communication device configured to receive from the personal communication device a request for initiating the application on the personal communication device; and
one or more processors configured to process the set of instructions stored in the non-transitory memory, including:
determining whether or not to allow executing the application on the personal communication device in response to receive the request;
receiving, through the local communication device, input data for the application from the personal communication device in accordance with a determination of not allowing executing the application on the personal communication device;
interpreting the input data using the set of instructions associated with the application to determine whether or not executing the application using the input data is restricted;
executing the application using the input data in accordance with a determination of not restricting executing the application using the input data; and
instructing the local communication device to transmit output data to be presented by the second device, wherein the output data reflects an updated state of the application as executed on the apparatus that is different from the input data.

12. The apparatus of claim 11, wherein:
determining whether or not to allow executing the application on the personal communication device includes traversing an access control list stored in the non-transitory memory to determine a privilege of the application for access to the personal communication device; and
the determination of not allowing executing the application on the personal communication device includes determining that the application lacks the privilege for access to the personal communication device.

13. The apparatus of claim 12, wherein executing the application on the apparatus includes:
executing the application on the personal communication device when it is determined that the application has the privilege for access to the personal communication device.

14. The apparatus of claim 11, wherein the one or more processors are further configured to process the set of instructions including:
determining that access to the input data is restricted; and
blocking the application from accessing the input data.

15. The apparatus of claim 14, wherein determining that access to the input data is prohibited includes:
determining that the input data includes user contact information.

16. The apparatus of claim 14, wherein determining that access to the input data is prohibited includes:
determining that the input data includes geographical position information of the personal communication device.

17. The apparatus of claim 11, wherein the apparatus further includes:
a remote communication device configured to communicate the output data to a remote destination.

18. The apparatus of claim 11, wherein the non-transitory memory further includes a secure storage for storing a set of digital keys.

19. The apparatus of claim 18, wherein the one or more processors are further configured to process the set of instructions including:
retrieving a digital key from the set of digital keys; and
authenticating the application using the digital key, including comparing a signature of the application with the digital key.

20. The apparatus of claim 11, wherein the one or more processors are further configured to process the set of instructions including:
permitting executing of the application on the personal communication device in accordance with the determination of allowing executing the application on the personal communication device.

* * * * *

UNITED STATES PATENT AND TRADEMARK OFFICE
CERTIFICATE OF CORRECTION

PATENT NO. : 11,303,639 B2
APPLICATION NO. : 16/747322
DATED : April 12, 2022
INVENTOR(S) : Michael Fong and Neric Hsin-wu Fong It is certified that error appears in the above-identified patent and that said Letters Patent is hereby corrected as shown below:

On the Title Page

In the Inventors item (72):
Change "Nerie Hsin-Wu Fong" to --Neric Hsin-Wu Fong--

Signed and Sealed this
Twentieth Day of September, 2022

Katherine Kelly Vidal
*Director of the United States Patent and Trademark Office*